U. STANSBURY.
Bee Hive.
No. 83,335.
2 Sheets—Sheet 1.
Patented Oct. 20, 1868.
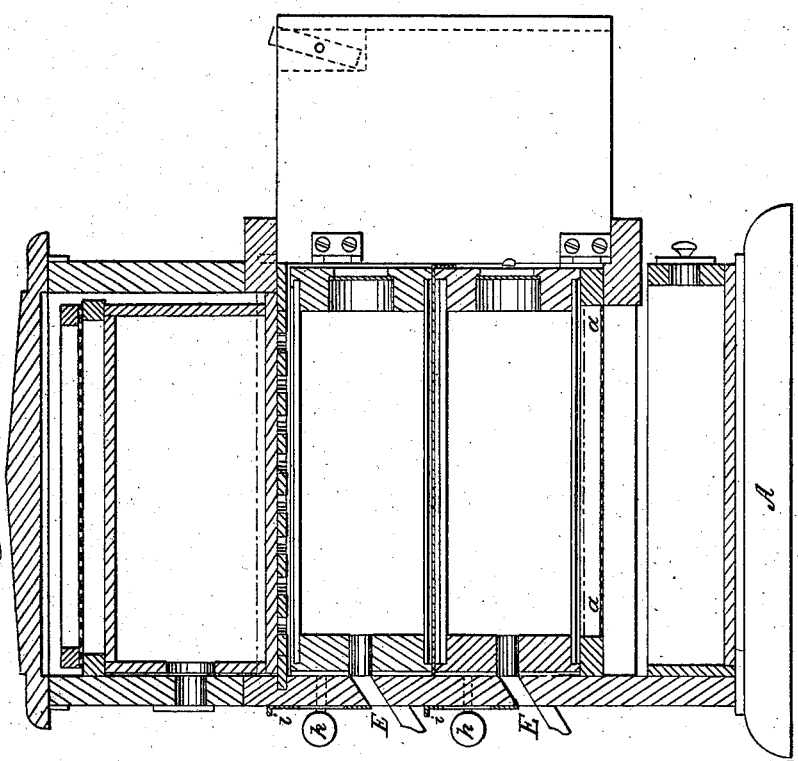
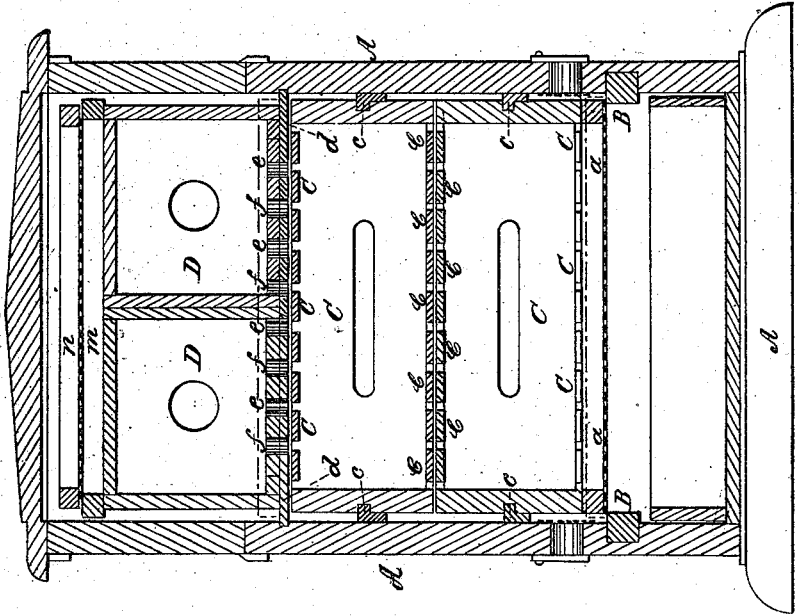
Witnesses:
Inventor:

U. STANSBURY.
Bee Hive.
No. 83,335.
2 Sheets—Sheet 2.
Patented Oct. 20, 1868.
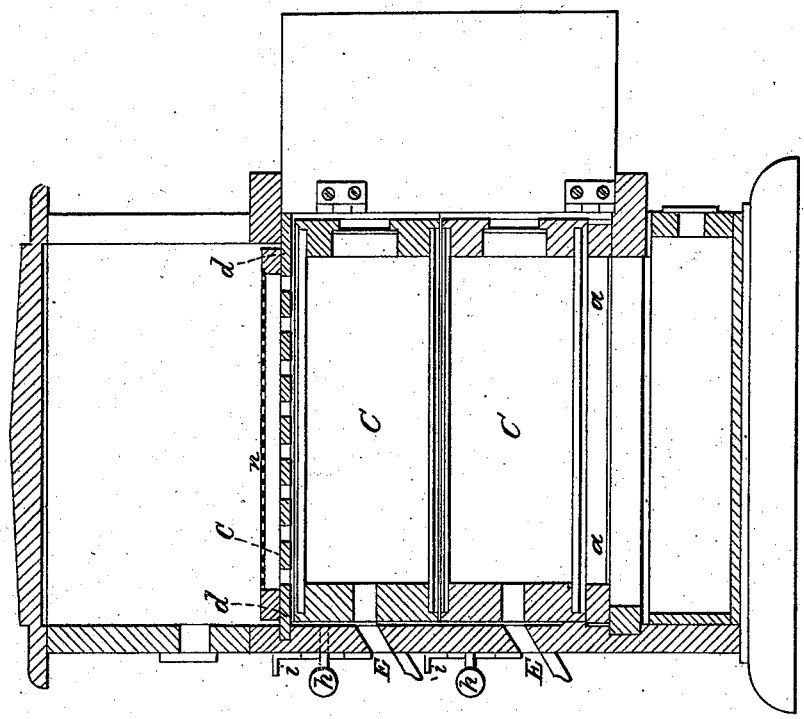
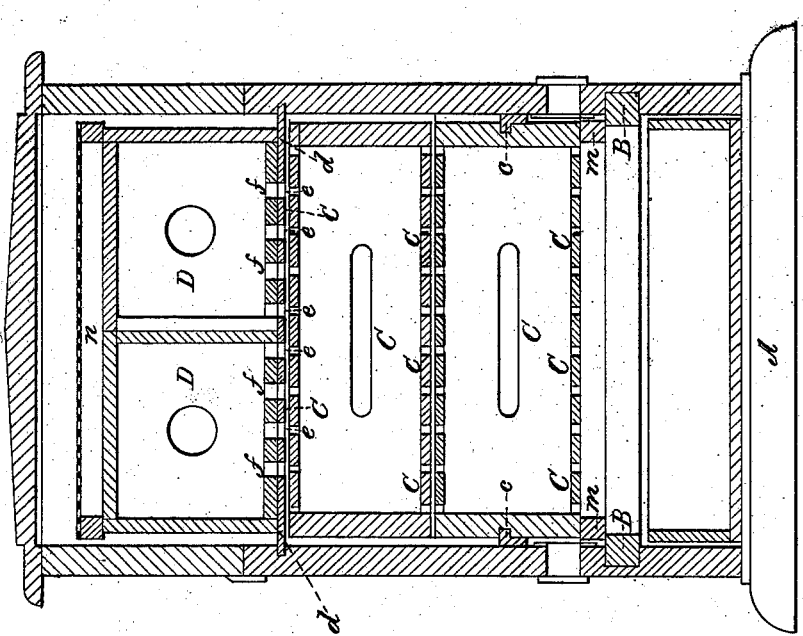
Witnesses:
Inventor:

UPTON STANSBURY, OF PLYMOUTH, INDIANA.

Letters Patent No. 83,335, dated October 20, 1868.

IMPROVEMENT IN BEE-HIVES.

The Schedule referred to in these Letters Patent and making part of the same.

*To all whom it may concern:*

Be it known that I, UPTON STANSBURY, of Plymouth, in the county of Marshall, and in the State of Indiana, have invented certain new and useful Improvements in Bee-Hives; and do hereby declare that the following is a full, clear, and exact description thereof, reference being had to the accompanying drawings, and to the letters of reference marked thereon.

Figure 1 represents a vertical section of the hive, showing the frame *m* and screen *n* stowed away on top of the honey-boxes;

Figure 2, a cross-section;

Figure 3, a vertical section, with the frame *m* in the position used when hiving the bees; and Figure 4, a cross-section, with the screen *n* placed over the honey-board, and with the honey-boxes removed.

The nature of my invention consists in breeding-boxes, made with slats in top and bottom, and in a perforated partition between the breeding-boxes and honey-boxes, and also in the general arrangement of the true hive with the frame.

To enable others skilled in the art to make and use my invention, I will proceed to describe its construction and operation.

In the annexed drawings, forming part of this specification, A represents the frame, which is so constructed as to leave any required space between it and the bottom of the true hive, and to give ample room for ventilation around the entire inside of the frame, and outside of the true hive. Above the space or room at the bottom of the frame A, is a slot or cleat, B, all around the inside, on which rests a screen of fine wire, marked *a* on the drawings. When the bees are to be hived, this screen, *a*, is taken out, and the frame *m*, without a screen, now placed on top of the honey-boxes, is put in. This allows the bees to enter the main hive, and prevents them crawling around the outside of the boxes. The position of the frame *m* is shown in red lines in fig. 1.

The breeding-boxes C C, or drawers, are in the lower part of the hive, and made with slats on top and bottom, and they are held in position by slots or ways *c c*, on each side of the frame A, running into grooves on the sides of the boxes, as shown in the left-hand drawing. Above the breeding-boxes is a partition, *d*, perforated with quite a number of holes, *e e*, for the bees to work in and out of the honey-boxes D D, which are placed above the partition *d*, and have their bottom perforated with holes *f*, corresponding with those in the partition. When the bees are to be driven from one part to another, or from one breeding-box to another, a sheet of tin is slipped between the two, and one box is drawn out a trifle. A slight puff of smoke into the box drives the bees out, and the tin being slipped back, prevents their returning.

In winter, the honey-boxes are often removed, and then a fine-wire screen, *n*, now placed on top of the honey-boxes, is placed over the holes in the partition *d*, and the upper section well filled with clean straw.

The hive has two entrances, E E, which are closed by a slide, *i*, on the outside of the frame A, and secured by a screw, *h*. There is also a number of holes secured by screens in the outside box or frame, for purposes of ventilation and light, and the breeding and honey-boxes are also provided with windows to admit light.

The frame *m* and wire screen *n* are placed on top of the honey-boxes D D, as being the most convenient place for them when not used, as above described.

Having thus fully described my invention,

What I claim as new, and desire to secure by Letters Patent, is—

1. The breeding-boxes C C, closed at their sides and ends, and slotted at the top and bottom, and provided with small glass windows and entrances, and connected to the cleats *c c* of box A, by means of their grooved sides, as herein set forth.

2. The arrangement of the outside box A with the breeding-boxes C C, honey-boxes D D, and slide-screens *a* and *n*, substantially as and for the purposes herein set forth.

In testimony that I claim the foregoing, I have hereunto set my hand, this 20th day of April, 1868.

UPTON STANSBURY.

Witnesses:
 NATHAN DICKSON,
 GEORGE DREW.